United States Patent [19]

Henning et al.

[11] Patent Number: 4,616,061

[45] Date of Patent: Oct. 7, 1986

[54] AQUEOUS SOLUTIONS OR DISPERSIONS OF POLYISOCYANATE ADDITION PRODUCTS, A PROCESS FOR THE PRODUCTION THEREOF AND THE USE THEREOF AS COATING AGENTS OR AS SIZING AGENTS FOR PAPER

[75] Inventors: Wolfgang Henning, Kuerten; Walter Meckel, Neuss; Ulrich Beck, Bornheim; Heinz Bäumgen, Leverkusen, all of Fed. Rep. of Germany

[73] Assignee: Bayer Aktiengesellschaft, Leverkusen, Fed. Rep. of Germany

[21] Appl. No.: 785,818

[22] Filed: Oct. 9, 1985

[30] Foreign Application Priority Data

Oct. 20, 1984 [DE] Fed. Rep. of Germany ....... 3438563

[51] Int. Cl.$^4$ ............................................. C08L 75/04
[52] U.S. Cl. .................. 524/591; 427/385.5; 427/389; 427/389.8; 427/389.9; 427/391; 427/392; 427/393; 428/423.1; 428/423.4; 428/423.5; 428/423.7; 428/423.9; 428/425.1; 428/425.5; 428/425.6
[58] Field of Search ............... 524/591, 871, 874, 875; 427/385.5, 389, 389.8, 389.9, 391, 392, 393; 428/423.1, 423.4, 423.5, 423.7, 423.9, 425.1, 425.5, 425.6

[56] References Cited

U.S. PATENT DOCUMENTS

| | | | |
|---|---|---|---|
| 3,036,998 | 5/1962 | Rudner et al. | 260/77.5 |
| 3,388,087 | 6/1968 | Dieterich et al. | 260/29.2 |
| 3,479,310 | 11/1969 | Dieterich et al. | 260/29.2 |
| 3,480,592 | 11/1969 | Dieterich et al. | 260/77.5 |
| 3,517,039 | 6/1970 | Wagner | 260/404.5 |
| 3,686,108 | 8/1972 | Reiff | 260/29.2 |
| 3,756,992 | 9/1973 | Dieterich et al. | 260/77.5 |
| 3,971,764 | 7/1976 | Schurmann | 260/77.5 |
| 4,028,310 | 6/1977 | Schafer et al. | 260/77.5 |
| 4,028,313 | 6/1977 | Muller et al. | 260/77.5 |
| 4,077,989 | 3/1978 | Schafer et al. | 260/404.5 |
| 4,086,193 | 4/1978 | Reischl | 260/2.5 |
| 4,094,842 | 6/1978 | Wenzel et al. | 260/29.2 |
| 4,096,127 | 6/1978 | Schurmann et al. | 260/77.5 |
| 4,108,814 | 8/1978 | Reiff | 260/29.2 |
| 4,172,936 | 10/1979 | Schafer | 528/49 |

FOREIGN PATENT DOCUMENTS

| | | |
|---|---|---|
| 880485 | 5/1953 | Fed. Rep. of Germany . |
| 1044404 | 11/1957 | Fed. Rep. of Germany . |
| 2427274 | 6/1974 | Fed. Rep. of Germany . |
| 1058339 | 2/1967 | United Kingdom . |
| 1148244 | 4/1969 | United Kingdom . |
| 1336050 | 11/1973 | United Kingdom . |
| 1524317 | 9/1978 | United Kingdom . |

OTHER PUBLICATIONS

Angewandte Chemie 1970, 82, 53.
Markromol Chemie 26, 85 et seq. 1972 (including Translation).

Primary Examiner—Maurice J. Welsh
Attorney, Agent, or Firm—Gene Harsh; Joseph C. Gil; Thomas W. Roy

[57] ABSTRACT

The present invention relates to aqueous solutions or dispersions of polyisocyanate addition products, which contain a quantity of incorporated sulphonate and/or carboxylate groups and optionally ethylene oxide units, —CH$_2$—CH$_2$—O—, incorporated in a polyether chain to guarantee the solubility or dispersibility thereof in water, the content of sulphonate and/or carboxylate groups being about 2 to 300 milliequivalents per 100 g of solids and the content of the aforementioned ethylene oxide units being up to about 25% by weight, based on solids, characterized in that the polyisocyanate addition products have segments incorporated in the polymer chain which correspond to the following general formula:

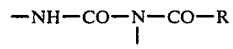

in an amount of about 0.1 to 20% by weight based on the above formulas, but excluding the weight of R.

The present invention also relates to a process for the production of the polyisocyanate addition products and to their use as coating agents for flexible or inflexible substrates and as sizing agents for paper or for the production of sizing agents for paper.

5 Claims, No Drawings

AQUEOUS SOLUTIONS OR DISPERSIONS OF POLYISOCYANATE ADDITION PRODUCTS, A PROCESS FOR THE PRODUCTION THEREOF AND THE USE THEREOF AS COATING AGENTS OR AS SIZING AGENTS FOR PAPER

BACKGROUND OF THE INVENTION

1. Field of the Invention

This invention relates to new solutions or dispersions of acylurea group-containing anionically-and optionally nonionically hydrophilically-modified polyisocyanate addition products, to a process for the production thereof and to the use thereof as coating agents for flexible or inflexible substrates or as sizing agents for paper.

2. Description of the Prior Art

Processes for the production of ionically-modified polyurethanes are known and are described, for example, in the following literature: DE-PS No. 880,485, DE-AS No. 1,044,404, U.S. Pat. No. 3,036,998, DE-PS Nos. 1,178,586, 1,184,946, DE-AS Nos. 1,237,306, 1,495,745, DE-OS Nos. 1,595,602, 1,770,068, 2,019,324, 2,035,732, 2,446,440, 2,345,256, 2,345,245, 2,427,274, U.S. Pat. No. 3,479,310 and Angewandte Chemie 82, 53 (1970) and Angew. Makromol. Chem. 26, 85 et seq (1972).

Aqueous dispersions of the aforementioned polyurethanes may be used in a wide range of applications, for example as adhesives or for coating different flexible or inflexible substrates.

In spite of the plurality of known processes and the products obtained thereby, there still remains a need for aqueous dispersions having specific properties.

There is provided by the process described in more detail below the opportunity of specifically modifying, within a wide range, the property spectrum of such products in a straightforward manner by selecting an organic substituent which is bound via an acylurea group.

The production of acylurea group-containing isocyanate polyaddition products is known and described, for example, in DE-OS No. 2,436,740 or DE-OS No. 2,714,293. According to these known processes, the products are either produced in solution and then converted with film formation to coatings, lacquer coatings or films (DE-OS No. 2,436,740) or acylurea group-containing polyhydroxyl compounds are first produced, which may then be converted to acylurea group-containing foams (DE-OS No. 2,714,293). Nonetheless, it was not foreseeable that this principle is transferable to the chemistry of aqueous polyurethane dispersions, more particularly that the dispersions of polyurethanes according to the present invention, which are described in more detail below, having hydrophobic side chains bound via acylurea groups, would be at least equal to, for example, DE-OS No. 2,400,490 in terms of suitability as sizing agents for paper. The dispersions or solutions of carboxylate group- and hydrophobic side chain-containing polyurethanes in particular, which are described in more detail below, are superior to the paper sizing agents disclosed in the latter-mentioned prepublications because of the reduced tendency thereof to form foam in the liquor and in terms of the suitability thereof both for alum-free and alum-containing or pre-sized or wood-containing paper.

SUMMARY OF THE INVENTION

The present invention relates to aqueous solutions or dispersions of polyisocyanate addition products, which contain a quantity of incorporated sulfonate and/or carboxylate groups and optionally ethylene oxide units, —CH$_2$—CH$_2$—O—, incorporated in a polyether chain to guarantee the solubility or dispersibility thereof in water, the content of sulfonate and/or carboxylate groups being about 2 to 300 milliequivalents per 100 g of solids and the content of the aforementioned ethylene oxide units being up to about 25% by weight based on solids, characterized in that the polyisocyanate addition products have segments incorporated in the polymer chain which correspond to the following general formula:

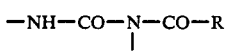

wherein

R represents a saturated or unsaturated aliphatic hydrocarbon radical having from 1 to 35 carbon atoms, preferably 9 to 22 carbon atoms, an aromatic hydrocarbon radical having 6 to 10 carbon atoms or an araliphatic hydrocarbon radical having 7 to 10 carbon atoms or, if several radicals R are present in the same molecule, R may represent different radicals corresponding to the above definition;

the polyisocyanate addition product containing a total of incorporated structural units as set forth in the above general formula which is determined by the quantity of acylated urea groups corresponding to the following formula:

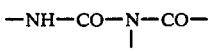

in the polyisocyanate addition product of about 0.1 to 20% by weight, based on solids.

The present invention also relates to a process for the production of such solutions or dispersions by reacting (a) organic polyisocyanates, optionally in combination with the organic monoisocyanates with (b) isocyanate-reactive group-containing compounds, optionally in the presence of (c) further auxiliaries and additives;

sulphonate and/or carboxylate group-containing structural components or structural components containing groups convertible thereto also being used as structural components (a), (b) and/or (c), the at least partial conversion of the groups which are convertible to the above salt groups taking place during or after the polyaddition and optionally with the simultaneous use of structural components (a) and/or (b) containing ethylene oxide units in a polyether chain, the total of such hydrophilic structural components being calculated such that the polyisocyanate-polyaddition product contains a quantity of carboxylate and/or sulphonate groups to guarantee solubility or dispersibility in water of about 2 to 300 milliequivalents per 100 g of solids and optionally a quantity of ethylene oxide units of the above-mentioned type of up to about 25%, by weight, the polyisocyanate addition product produced in this manner being converted into an aqueous solution or dispersion during or after the addition reaction, characterized in that structural components containing acylurea groups corresponding to the following formula:

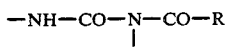

make up at least a portion of structural components (a) and/or (b), the quantity being calculated such that the polyisocyanate addition product contains about 0.1 to 20% by weight, based on solids, of acylurea group-forming structural units corresponding to the formula:

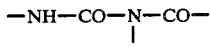

The present invention further relates to the use of the present solutions or dispersions as coating agents for flexible or inflexible substrates and as sizing agents for paper, or for the production of sizing agents for paper.

DETAILED DESCRIPTION OF THE INVENTION

For the production of the dispersions according to the present invention, there are used (a) organic polyisocyanates, optionally with the simultaneous use of monofunctional isocyanates:

(b) compounds containing at least two isocyanate-reactive groups, optionally with the simultaneous use of suitable monofunctional compounds: and, optionally, (c) further auxiliaries and additives.

The following are examples of suitable starting components (a):

(a1) diisocyanates corresponding to the following general formula: $Q(NCO)_2$, wherein Q represents an aliphatic hydrocarbon radical having 4 to 12 carbon atoms, a cycloaliphatic hydrocarbon radical having 6 to 15 carbon atoms, an aromatic hydrocarbon radical having 6 to 15 carbon atoms or an araliphatic hydrocarbon radical having 7 to 15 carbon atoms. The following are examples of such diisocyanates which are preferably used: tetramethylene diisocyanate, hexamethylene diisocyanate, dodecamethylene diisocyanate, 1,4-diisocyanatocyclohexane, 1-isocyanato-3,3,5-trimethyl-5-isocyanatomethylcyclohexane, 4,4'-diisocyanato-dicyclohexylmethane, 4,4'-diisocyanatodicyclohexylpropane-(2,2), 1,4-diisocyanatobenzene, 2,4-diisocyanatotoluene, 2,6-diisocyanatotoluene, 4,4'-diisocyanatodiphenylmethane, 4,4'-diisocyanatodiphenylpropane-(2,2), p-xylylene-diisocyanate or $\alpha,\alpha,\alpha',\alpha'$-tetramethyl-m- or p-xylylenediisocyanate, and mixtures thereof.

The following are further examples of structural components (a) which are suitable according to the present invention: (a2) NCO group-containing prepolymers known from polyurethane chemistry such as may be obtained by reacting simple diisocyanates of the type exemplified in (a1) with organic polyhydroxyl compounds of the type exemplified in (b1), at an NCO/OH equivalent ratio of about 1.2:1 to 10:1, preferably about 1.5:1 to 2.5:1. It may be seen from the given equivalent ratio that in the context of the present invention, NCO prepolymers also refers to so-called "semi-prepolymers", that is mixtures, of excess unreacted diisocyanates with true NCO-prepolymers.

The following are further examples of starting components (a) which are suitable according to the present invention:

(a3) polyisocyanates containing acylurea groups corresponding to the following general formula:

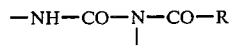

wherein R is as defined above.

It is in principle possible to use those polyisocyanates containing several such acylurea groups as component (a3), the individual radicals R being as defined above, but being different from each other.

The acylurea group-containing polyisocyanates (a3) may be relatively low molecular weight or relatively high molecular weight NCO prepolymers. The structural components (a3) are produced, analogously to the teaching of DE-OS No. 2,436,741, by partially carbodiimidizing the isocyanate groups of organic polyisocyanates of the type (a1) and (a2) and adding organic carboxylic acids R—COOH to the resulting carbodiimidemodified polyisocyanates. Typical examples of suitable structural components (a3) are, for example, diisocyanates, corresponding to the following general formula:

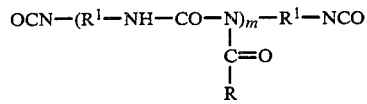

which are produced completely or partially reacting the carbodiimide groups of a diisocyanatocarbodiimide corresponding to the following general formula:

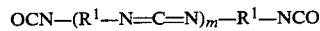

with carboxylic acids corresponding to the following general formula:

optionally in the presence of a suitable solvent at a temperature of from 25° to 100° C., wherein R represents a radical of the type given above in the definition of R;

$R^1$ represents a divalent, optionally urethane-, ester- and/or ether group-containing hydrocarbon radical, such as is obtained by removing the terminal isocyanate groups from a simple organic diisocyanate or a urethane group- and optionally ether or ester group-containing NCO-prepolymer, and, if several radicals $R^1$ are present in the same molecule, may represent different radicals $R^1$ corresponding to the aforementioned definition; and m represents a whole or (as a statistical average) a fractional number of from 1 to 10, preferably from 1 to 4.

The production of diisocyanatocarbodiimides is known and is described, for example, in U.S. Pat. Nos. 2,840,589 and 2,941,966 and by P. W. Campbell and K. C. Smeltz in the Journal of Organic Chemistry, 28, 2069 (1963). Diisocyanatocarbodiimides may also be produced carefully and free from by-products by heterogeneous catalysis according to German Offenlegungsschrift Nos. 2,504,400 and 2,552,350. The carbodiimidization of diisocyanates in the presence of very small quantities of phospholine oxide with the subsequent blocking of the catalyst with acid chlorides is described in DE-OS No. 2,653,120.

Aromatic diisocyanates of the type given above, for example, in (a1) are preferably used as structural components for the carbodiimide group-containing diisocyanates.

The following are examples of suitable carboxylic acids corresponding to the general formula R—COOH: acetic acid, propionic acid, hexane carboxylic acid, lauric acid, palmitic acid, stearic acid, benzoic acid, phenylacetic acid, acrylic acid, methacrylic acid, crotonic acid, 10-undecanoic acid, oleic acid or linoleic acid. It is also possible, in principle, to use other monocarboxylic acids in the process according to the present invention which do not correspond to the aforementioned definition of R such as chloroacetic acid, cyclohexane carboxylic acid, abietic acid, 4-dimethylaminobenzoic acid or monoesters or monoamides of dicarboxylic acids such as oxalic acid, malonic acid, succinic acid, maleic acid, fumaric acid or phthalic acid with monohydric alcohols or amines. The use of such monocarboxylic acids is less preferred for reasons of cost; however, it would provide an equivalent embodiment of the present process. Mixtures of the above acids, for example corresponding to the general formula R—COOH, may in principle be used in the process according to the present invention. The quantity of acid used is calculated in such a manner that there are about 0.2 to 1.2, preferably about 0.5 to 1.2, mols of carboxyl groups in the reaction mixture per mol of carbodiimide groups. The acylurea group-containing NCO prepolymers which are also suitable as structural component (a3) may be produced, for example, either by reacting the aforementioned relatively low molecular weight diisocyanatebased, acylurea group-containing polyisocyanates with sub-equivalent quantities of polyhydroxyl compounds of the type given, for example, in (b1) and/or (b2) or by partially carbodiimidizing NCO-prepolymers of the type given above, for example, in (a2) and subsequently reacting the carbodiimidization products with carboxylic acids R—COOH, analogously to the details given above.

The following are further examples of structural components (a) which may be used according to the present invention:

(a4) hydrophilically-modified polyisocyanates, for example diisocyanates containing lateral polyether chains having incorporated ethylene oxide units according to U.S. Pat. No. 3,920,598 or sulfonated diisocyanates of the type given, for example, in DE-OS No. 2,227,111 or DE-OS No. 2,359,615. The simultaneous use of such hydrophilically-modified polyisocyanates is, however, less preferred since the hydrophilic groups are preferably incorporated in the present process via structural component (b) which will be described in more detail below.

It is also in principle possible in the present process to use the exemplified structural components (a1) to (a4) in conjunction with higher functional low molecular weight polyisocyanates, such as the reaction product of 3 mols of 2,4-diisocyanatotoluene with 1 mol of trimethylolpropane and/or in conjunction with monofunctional isocyanates, such as phenylisocyanate, hexylisocyanate or n-dodecylisocyanate. The use of monofunctional isocyanates containing polyether chains having incorporated ethylene oxide units of the type given in U.S. Pat. Nos. 3,920,598 or 4,237,264 is also possible in principle. However, when using such monofunctional isocyanates, premature chain termination is generally to be prevented, particularly in the production of high molecular weight polyurethanes, by the simultaneous use of higher than difunctional structural components. Difunctional isocyanates of the type exemplified above are preferably used as structural component (a) in the present process.

The following are examples of structural components (b) which are suitable for the process according to the present invention: (b1) the polyhydroxy-polyesters or -polyethers known from polyurethane chemistry having a molecular weight of 400 to about 4000, preferably difunctional compounds, such as those obtained in known manner by reacting polybasic acids, particularly dibasic acids such as adipic acid, phthalic acid, tetrahydrophthalic acid and/or hexahydrophthalic acid with excess quantities of polyhydric alcohols, preferably dihydric alcohols, of the type exemplified in (b2); or by alkoxylating suitable starting molecules such as water, ammonia, aniline, or the polyhydric alcohols given, for example, in (b2), with alkylene oxides, such as ethylene oxide and/or propylene oxide.

The following are further examples of structural components (b), which are suitable for the process according to the present invention: (b2) polyhydric alcohols, particularly dihydric alcohols, having a molecular weight of from 62 to 399, particularly the corresponding alkane polyols such as ethylene glycol, propylene glycol, hexamethylene diol, glycerine, trimethylolpropane or trimethylolethane or relatively low molecular weight ether group-containing alcohols such as diethylene glycol, triethylene glycol, dipropylene glycol or tripropylene glycol. Mixtures of such alcohols may also be used in the present process.

The following are further examples of structural components (b) which are suitable for the process according to the present invention: (b3) compounds containing at least two aminic or hydrazinic amino groups and having a molecular weight of from 32 to 400 such as ethylene diamine, hexamethylene diamine, isophorone diamine, 2,4-diaminotoluene, 4,4'-diaminodiphenyl methane, 4,4'-diaminodicyclohexylmethane, diethylene triamine, triethylene tetramine, hydrazine or hydrazine hydrate. Such structural components may also be used in blocked form, i.e., particularly in the form of the corresponding ketimines or ketazines (reaction products with simple ketones such as acetone, methyl ethyl ketone or methyl isobutyl ketone). If such blocked chain-lengthening agents are used, the release of the isocyanate-reactive groups only occurs under the hydrolytic influence of the dispersing water. The following are further examples of compounds which are suitable as structural component (b):

(b4) ionic structural components or potential ionic structural components which contain at least one carboxyl, carboxylate, sulphonic acid and/or sulphonate group in addition to at least one isocyanate-reactive groups. This includes the sulphonate group-containing aliphatic diols according to DE-OS No. 2,446,440 or DE-OS No. 2,437,218: carboxylate group-containing diols or diols containing carboxyl groups which are convertible to carboxylate groups; and/or diamino-sulphonates of the type described in CA 928,323 such as the sodium salt of N-(2-aminoethyl)-2-aminoethane sulphonic acid. The ionic structural components (b4)

which are particularly preferred include sulphonate diols corresponding to the following general formula:

$$H-(OCH-CH_2)_{\overline{n}}-O-(A)_{\overline{o}}-CH-(B)_{\overline{p}}-O-(CH_2-CH-O)_m H$$
$$\phantom{H-(OC}R' \phantom{H-CH_2)_{\overline{n}}-O-(A)_{\overline{o}}-C}(CH_2)_q \phantom{-O-(CH_2-CH}R'$$
$$\phantom{H-(OCH-CH_2)_{\overline{n}}-O-(A)_{\overline{o}}-CH-(B)_{\overline{p}}}SO_3^{\ominus}X^{\oplus}$$

wherein

A and B represent the same or different divalent aliphatic hydrocarbon radicals having from 1 to 6 carbon atoms:

R' represents hydrogen, an aliphatic hydrocarbon radical having from 1 to 4 carbon atoms or a phenyl radical;

X⊕ represents an alkali metal cation or an optionally-substituted ammonium group:

n and m represent the same or different numbers of from 0 to 30;

o and p each represents 0 or 1; and q represents a number of from 0 to 2.

The preferred structural components (b4) having carboxylate groups or groups which are convertible to carboxylate groups include hydroxycarboxylic acids corresponding to the following general formula:

$$(HO)_x-Q(COOH)_y$$

wherein

Q represents a straight- or branched-chain hydrocarbon radical having from 1 to 12 carbon atoms: and x and y each represents an integer of from 1 to 3, the sum of x+y being from 2 to 4.

The structural components (b4) of the latter-mentioned formula which are particularly preferred include those acids wherein x represents 2 and y represents 1, as described, for example, in U.S. Pat. No. 3,412,054. α,α-dimethylolpropionic acid or the salts thereof with tertiary amines such as trimethylamine, triethylamine, N-methylmorpholine, N-ethylmorpholine, N-methylpiperazine, N,N-dimethyl-ethanolamine or N-methyldiethanolamine are the structural components (b4) of the latter-mentioned general formula which are most particularly preferred.

The following are further examples of structural components (b) which are suitable according to the present invention:

(b5) mono- or di-hydric alcohols containing polyether chains having incorporated ethylene oxide units. This includes, for example, compounds corresponding to the following general formula:

$$\phantom{HO-}R'' \phantom{-CH_2-N-CH_2-}R''$$
$$HO-CH-CH_2-N-CH_2-CH-OH$$
$$\phantom{HO-CH-CH_2-}CO-NH-Q-NH-CO-O-X-Y-R'''$$

wherein

Q represents a divalent radical such as is obtained by removing the isocyanate groups from a diisocyanate Q(NCO)₂ of the type given in (a1):

R'' represents hydrogen or a monovalent hydrocarbon radical having from 1 to 8 carbon atoms, preferably hydrogen or a methyl group;

R''' represents a monovalent hydrocarbon radical having from 1 to 12 carbon atoms, preferably an unsubstituted alkyl radical having from 1 to 4 carbon atoms:

X represents a radical, such as is obtained by removing the terminal oxygen atom from a polyalkylene oxide chain having about 5 to 90, preferably about 20 to 70, chain members, up to about 40%, preferably up to about 65%, of which are ethylene oxide units and the remainder may be propylene oxide, butylene oxide or styrene oxide units in addition to ethylene oxide units; propylene oxide units are preferred among the latter-mentioned units; and Y represents oxygen or $-NR^{IV}-$, $R^{IV}$ corresponding to R''' in relation to its definition.

The compounds corresponding to the latter-mentioned general formulae may be produced according to the methods given in U.S. Pat. Nos. 3,905,929 or 4,190,566.

Further preferred incorporated hydrophilic components (b5) are compounds corresponding to the following general formula:

$$HO-X-Y-R'''$$

wherein X, Y and R''' are as defined above.

It may often be advantageous when using such monofunctional non-ionic hydrophilic polyethers to prevent a premature chain-termination by the simultaneous use of higher than difunctional structural components. The monofunctional polyethers corresponding to the latter-mentioned general formula are produced by known process as described, for example, in U.S. Pat. Nos. 3,905,929, 4,190,566 or 4,237,264.

The following are further examples of structural components (b) which are suitable according to the present invention:

(b6) amino alcohols having a molecular weight of 61 to about 300 such as ethanolamine, propanolamine, diethanolamine or dipropanolamine.

The following are further examples of structural components (b) which are suitable according to the present invention:

(b7) acylurea group-containing polyhydric, preferably dihydric, alcohols such as may be obtained, for example, by reacting the acylurea group-containing diisocyanates given, for example, in (a3) (particularly those based on relatively low molecular weight starting diisocyanates) with the compounds such as those in (b1), (b2) and/or (b6) at an OH/NCO ratio of about 1.2:1 to 30:1, or, when using the amino alcohols (b6), an NH₂/NCO ratio of about 0.6:1 to 1.2:1. Preferred alcohols of this type (b7) are those prepared by reacting the carbodiimide group-containing polyisocyanates given in connection with (a3) (preferably diisocyanates based on relatively low molecular weight starting diisocyanates) with the aforementioned polyhydroxyl compounds at an OH/NCO equivalent ratio of about 1.2:1 to 30:1, or, when using the amino alcohols (b6), an NH₂/NCO ratio of about 0.6:1 to 1.2:1 and subsequently reacting the reaction products with carboxylic acids R-COOH as described above. In both cases, the polyhydroxyl component is preferably reacted with the isocyanate component while observing an OH/NCO equivalent ratio of about 1.5:1 to 15:1, more particularly about 1.5:1 to 3:1. The hydroxyl group-containing structural components (b7) or the intermediate products having carbodiimide groups used for the production thereof are generally produced at a temperature of about 25° to 130° C., preferably about 50° to 120° C., optionally in the presence of an inert solvent of the type given, for example, in DE-OS No. 2,714,293 or U.S.

Pat. No. 4,172,936, herein incorporated by reference. Reference is hereby made to this publication in relation to the production details of such acylurea group-containing polyhydroxyl compounds.

The following are further examples of structural components (b) which are suitable according to the present invention:

(b8) water-soluble salts of aromatic or aliphatic monohydroxy- or monoamino- carboxylic acids such as the ammonium or alkali metal salts of 4-aminobenzoic acid, lactic acid, glycine or alanine.

The following is a further example of a structural component (b) which is suitable according to the present invention:

(b9) water which may assume the double function of the continuous phase of the dispersions according to the present invention on one hand and that of a chain-lengthening agent on the other hand.

Structural components (b) which are difunctional in the isocyanate addition reaction are preferably used in the present process. However, as explained above, it is also possible to use monofunctional structural components (b), particularly of the type given in (b5) or (b8) or when desired for the purpose of chain branching, to use higher than difunctional structural components (b).

The following are examples of auxiliaries and additives (c) which may optionally also be used in the process according to the present invention:

(c1) cyclic anhydrides of polycarboxylic acids which react to produce carboxylic acid semi-esters by reaction with OH groups and as such form potential salt groups. Suitable anhydrides include 5- or 6-member ring compounds corresponding to the following general formula:

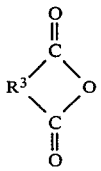

wherein
R$^3$ represents an optionally olefinically unsaturated aliphatic, an optionally olefinically unsaturated cycloaliphatic and/or an optionally chlorosubstituted aromatic hydrocarbon radical having 2 to 20, preferably 2 to 6, carbon atoms as obtained by removing the carboxyl groups from a suitable 1,2-dicarboxylic acid.

The following are typical examples of components (c1) which may also be used according to the present invention: succinic acid anhydride, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, trimellitic acid anhydride, pyromellitic acid dianhydride and maleic acid anhydride.

The exemplified acid anhydrides are a particular form of structural component having potential carboxyl groups. Thus, it is possible to produce a hydroxyl group-containing polyisocyanate-addition product from the exemplified structural components (a) and (b), which polyisocyanate addition product may then be reacted with the acid anhydrides with the ring-opening formation of carboxyl groups, subsequent to which neutralization of the resulting carboxyl groups takes place for the purpose of introducing carboxylate groups.

The following are further examples of auxiliaries and additives (c) which may optionally also be used according to the present invention:

(c2) neutralizing agents for carboxyl groups which are intermediately incorporated into the polyurethanes. Various inorganic or organic bases may, in principle, be used for this purpose. Tertiary amines such as trimethylamine, triethylamine, N-methylmorpholine, N-methyldiethanolamine or N,N-dimethylethanolamine, are preferably used to neutralize the carboxyl and/or sulphonic acid groups which are optionally intermediately present in the addition products.

The following are further examples of auxiliaries and additives (c) which may optionally also be used in the process according to the present invention:

(c3) solvents which are optionally used in the synthesis of polyurethanes. Suitable solvents include toluene, xylene, acetone, methyl glycol acetate, ethyl glycol acetate, butyl acetate, N-methylpyrrolidone, acetic acid ethyl ester or methyl ethyl ketone. Water-miscible solvents such as acetone or N-methylpyrrolidone are preferably used.

The following are further examples of auxiliaries and additives (c) which may optionally also be used in the process according to the present invention:

(c4) compounds which are capable of reacting with isocyanate groups with the formation of acylated amino groups in combination with compounds which are capable of reacting with such acylated amino groups in a condensation reaction. The former compounds include ammonia or urea, and the latter compounds include aldehydes, particularly formaldehyde. Such auxiliaries and additives (c4) are used if the "melt dispersion process," described in more detail below, is carried out.

The following are further examples of auxiliaries and additives (c) which may optionally also be used: inert fillers, pigments, dyes, plasticizers or additives which influence the rheological properties.

The process according to the present invention may be carried out, that is the dispersions according to the present invention may be produced, by prior art methods. However, in all embodiments of the present process, it should be ensured (i) that the structural components having ionic groups or potential ionic groups ((a4), (b4), (b8) and/or (c1)) are incorporated into the polyisocyanate addition product in such a quantity or that the degree of neutralization of the potential ionic groups which are incorporated into the polyurethanes is selected in such a manner that the polyisocyanate addition products contain a quantity of about 2 to 300, preferably about 5 to 200, more preferably about 5 to 120, milliequivalents per 100 g of solids of incorporated sulphonate and/or carboxylate groups, and it must be ensured that the polyisocyanate addition products contain a quantity of ionic groups which, together with the non-ionic hydrophilic groups which may optionally be present, ensure the solubility or dispersibility of the polyisocyanate addition products in water:

(ii) that the structural components having non-ionic hydrophilic groups which may optionally be used ((a4) and/or (b5)) are at most used in a quantity such that the content of the polyisocyanate addition products of ethylene oxide units —CH$_2$—CH$_2$—O—, incorporated in polyether chains, does not exceed about 25%, by weight, preferably about 20%, by weight, and more preferably about 15%, by weight, based on solids; and (iii) that the quantity of the acylurea group-containing structural components ((a3) and/or (b7)) is calculated in such a manner that the polyisocyanate addition products contain a quantity of structural units forming parts of acylurea groups corresponding to the following formula:

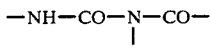

of about 0.1 to 20%, by weight, preferably about 2 to 15%, by weight.

As already explained, the process according to the present invention may be carried out according to several known embodiments.

(1) According to the "acetone process", an NCO-terminated prepolymer is produced in the melt or optionally in the presence of solvents of the type given, for example, in (c3), analogously to the teaching of DE-OS No. 1,495,745 (U.S. Pat. No. 3,479,310) or DE-OS No. 1,495,847 (GB No. 1,076,788). Simple diisocyanates of the type given in (a1), relatively high molecular weight polyhydroxyl compounds of the type given in (b1), chain-lengthening agents of the type given in (b2) or also in (b3), ionic structural components of the type given in (b4) or the corresponding potential ionic structural components, non-ionic hydrophilic structural components of the type given in (b5) and the acylurea group-containing structural components given in (a3) and/or (b7) may be used as starting materials in this process. Initially, an NCO-prepolymer is generally produced in this process which is then dissolved in a suitable solvent and chain-lengthened in solution to produce the polyurethane. The ionic groups are incorporated during production of the prepolymer by the simultaneous use of suitable ionic or potential ionic structural components (b4) and/or during chain-lengthening by the simultaneous use of relatively low molecular weight difunctional ionic structural components of the type given, for example, in (b4). Difunctional structural components of the type exemplified are preferably used in this embodiment. The equivalent ratio of isocyanate groups to isocyanate-reactive groups is preferably about 0.7:1 to 2:1. The solution of the polyurethane obtained in this manner is then mixed with water in which a neutralizing agent of the type given, for example, in (c2) may be used for the purpose of neutralizing potential ionic groups which may be present. If desired, the solvent may be distilled off from the resulting aqueous polyurethane dispersion subsequent to mixing with the water. A variant of this embodiment involves using previously separately produced NCO prepolymers of the type given in (a2), which together with acylurea group-containing structural components of the type given in (a3) and/or (b7) and preferably relatively low molecular weight ionic structural components of the type given in (b4) and optionally non-ionic hydrophilic structural components of the type given in (b5) are reacted in solution to produce a polyurethane, subsequent to which they are mixed with water.

(2) A further embodiment of the process according to the present invention corresponds to the method known from DE-OS No. 2,725,589, U.S. Pat. Nos. 4,269,748, 4,192,937 or 4,292,226 according to which blocked chain-lengthening agents of the type given in (b3) or even oxazolidines corresponding to the teaching of U.S. Pat. No. 4,192,937 or amine salts according to U.S. Pat. No. 4,292,226 are used as potential chain-lengthening agents. In this process, previously produced NCO-prepolymers which have been produced in the melt or in solution from the starting materials given above, acylurea group-containing structural components given in (a3) and/or (b7), ionic structural components of the type given in (b4) and optionally non-ionic hydrophilic structural components of the type given in (b5) are reacted at an equivalent ratio of isocyanate groups to isocyanate-reactive groups of about 1.2:1 to 3:1 and mixed with the aforementioned blocked chain-lengthening agents. This mixture is subsequently mixed with water, thereby releasing the previously blocked amine or hydrazine which reacts as the chain-lengthening agent with the prepolymer. In this process, the water may also contain in solution the neutralizing agent for potential ionic groups which may be present.

(3) A further embodiment of the present process is the "melt dispersion process" known from U.S. Pat. No. 3,756,992 wherein the terminal isocyanate groups of hydrophilically-modified prepolymers are converted in the melt with urea, ammonia or other suitable compounds into acylated amino groups which are converted into methylol groups before, during or after the addition of water by reaction with formaldehyde. The methylol group-containing products which are dispersed or dissolved in water may then be converted to high molecular weight polyurethanes by heating to a temperature of about 50° to 150° C. so that a condensation reaction of the reactive methylol groups results. The NCO-prepolymers used in this process are also produced, as in the second embodiment, by the use of structural components (a3) and/or (b7) which are essential to the present invention.

(4) A further embodiment for carrying out the present process involves initially dispersing in water, NCO-group-containing prepolymers which, as described above in (2), contain the structural components (a3) and/or (b7) which are essential to the present invention incorporated therein. The water may contain a neutralizing agent for neutralizing potential ionic groups which may be present. An aminic or hydrazinic chain-lengthening agent or cross-linking agent of the type given in (b3) having free amino groups is admixed with the aqueous dispersion obtained in this manner while maintaining an NCO/NH equivalent ratio of about 1:0.2 to 1:1.1, preferably about 1:0.3 to 1:0.98. Chain-lengthening is then carried out at a temperature of about 5° to 90° C., preferably about 20° to 80° C.

(5) A further embodiment of the process according to the present invention involves reacting "hydroxyl group-containing intermediates" which contain the quantity of acylurea groups essential to the present invention, but less than the required amount of ionic groups or potential ionic groups, with cyclic carboxylic acid anhydrides. The carboxylic acid anhydrides are used in this process in a quantity corresponding to an equivalent ratio of hydroxyl groups to the anhydride groups of about 0.9:1 to 10:1, preferably about 1:1 to 5:1, most preferably about 1:1 to 2:1. The reaction products obtained in this manner are subsequently dissolved or dispersed in water, the at least partial neutralization of the carboxyl groups taking place before and/or during dispersion. The hydroxyl group-containing intermediates are reacted with the carboxylic acid anhydrides in this process optionally in the presence of solvents of the type given in (c3), preferably at a temperature of about 20° to 150° C. and most preferably about 20° to 100° C.

The requisite "hydroxyl group-containing intermediates" are the acylurea group-containing polyhydroxyl compounds of the type given, for example, in (b7). Further suitable "hydroxyl group-containing intermediates" are prepolymers, which are produced analogously to the production of the NCO-prepolymers given in (1) to (3), albeit with the use of an excess of compounds having isocyanate-reactive groups, particularly hydroxyl groups, while observing an equivalent ratio of isocyanate groups to hydroxyl groups of about 0.2:1 to 0.9:1, preferably about 0.2:1 to 0.6:1 and most preferably about 0.3:1 to 0.5:1. As already explained, these hydroxyl group-containing prepolymers may contain more or only some of the hydrophilic structural units necessary for dissolving or dispersing the dissolved or dispersed reaction products.

A further embodiment for the production of the "hydroxyl group-containing intermediates" involves reacting the NCO-prepolymers given in (1) to (3) with relatively low molecular weight polyols of the type given in (b2) or preferably with amino alcohols such as ethanolamine, propanolamine or diethanolamine at an equivalent ratio of the isocyanate groups of the prepolymer to the isocyanate-reactive groups of about 0.2:1 to 0.6:1, preferably about 0.3:1 to 0.5:1. This reaction preferably takes place at a temperature of about 20° to 150° C., preferably about 50° to 130° C., in the melt or in the presence of suitable solvents of the type given, for example, in (c3).

(6) A further embodiment for carrying out the process according to the present invention involves reacting acylurea group-containing NCO-prepolymers of the type given, for example, in (a3) with monofunctional ionic structural components of the type given in (b8) in order to produce the polyisocyanate addition products according to the present invention. This reaction may take place in acetonic solution with the subsequent dispersion of the reaction product in water or by reacting an acetonic solution of component (a3) with an aqueous solution of component (b8). In this reaction, the quantitative ratios of the reaction constituents are generally selected in such a manner that the equivalent ratio of the isocyanate groups of component (a3) and the isocyanate-reactive groups of component (b8) is about 0.5:1 to 1.5:1.

The properties of the polyurethanes, particularly the molecular weight thereof, may be varied within wide limits and may be adapted to the application desired in each case by suitable selection of the starting components and the equivalent ratios used in the individual embodiments. As used herein, the term "polyisocyanate addition products" or "polyisocyanate polyaddition products" includes relatively low molecular weight reaction products, which may be produced by ionically-modifying the acylurea group-containing polyols with carboxylic acid anhydrides without further chain-lengthening.

The solutions or melts of the polyisocyanate addition products or prepolymers obtained according to the various embodiments may in principle be converted into an aqueous solution or dispersion by various methods. The use of apparatus which produces high shear gradients or the use of non-mechanical dispersing agents such as extremely high frequency sound waves is possible, but generally not necessary since simple mixing apparatus such as stirring tanks or so-called return mixers are sufficient for dispersing the generally self-dispersible polyisocyanate addition products or prepolymers. For the same reason, it is also in principle possible to produce polyisocyanate addition products according to the present invention in solid form, that is in the form of powders or resins or in lump form and to disperse or dissolve these materials in an independent stage.

Moreover, it has surprisingly been found that it is possible to use insufficient neutralizing agents for the potential hydrophilic groups so that relatively coarsely-divided dispersions or suspensions are initially produced which are subsequently converted into finely-divided dispersions or solutions by the addition of further counterions to the potential ionic groups which are still present. Owing to the low viscosity of the coarsely-divided intermediates, they may be produced at a relatively high solids content, thereby resulting in reduced transport costs.

If desired, the dispersions according to the present invention may also be modified subsequent to the production thereof with isocyanates analogously to the method of DE-OS No. 2,708,242.

In all embodiments of the process according to the present invention, the quantity of water is generally used so that solutions or dispersions containing a quantity of solids of up to about 60% by weight, preferably about 10 to 60% by weight and most preferably about 10 to 50% by weight, are produced. The particle diameter of the dispersed solids is generally less than 1 $\mu$m, preferably about 0.001 to 0.5 $\mu$m. The average particle diameter should be less than about 0.5 $\mu$m, preferably about 0.01 to 0.3 $\mu$m.

Average particle diameters of about 5 to about 50 $\mu$m may also be obtained if there is a very low content of hydrophilic groups. Such dispersions are of importance, for example, for the production of polyurethane powders.

If the dissolved or dispersed polyisocyanate addition products also contain ethylene oxide units as hydrophilic groups, they are substantially insensitive to electrolytes despite the ionic group content thereof.

The solutions or dispersions may be blended with other dispersions such as polyvinyl acetate, polyethylene, polystyrene, polybutadiene, polyvinylchloride, polyacrylate and copolymer plastics dispersions. The addition of known external emulsifiers, preferably ionic emulsifiers is possible, but not necessary.

Fillers, plasticizers, pigments, carbon black and silica sols, aluminum, clay, asbestos dispersions may also be incorporated into the dispersions.

The solutions or dispersions according to the present invention are for the most part stable, storable and transportable and may be processed at a later time. They generally dry directly to produce dimensionally-stable plastics coatings, but the products may also be shaped in the presence of known cross-linking agents.

Products having different properties are obtained depending on the type of incorporated acylurea groups. Thus, valuable paper sizing agents may be produced by the incorporation of relatively long-chain fatty acids R—COOH having at least 10 carbon atoms.

The problem-free introduction of lateral double bonds by the incorporation of unsaturated carboxylic acids R—COOH is a further advantage, providing the possibility of subsequent cross-linking.

Furthermore, the hydrophilic or hydrophobic nature of the products may be controlled in a straight-forward manner by selection of the lateral acylurea group radicals.

The products are suitable for coating or covering and impregnating woven and non-woven textiles, leather, paper, wood, metals, ceramic, stone, concrete, bitumen, rigid fibers, straw, glass, porcelain, plastics of all types and glass fibers for an anti-static and crease-proof finish; and as binders for webs, adhesives, adhesion promoters, covering agents, hydrophobizing agents, plasticizers, binders such as for cork or wood powder, glass fibers, asbestos, paper-like materials, plastics or rubber waste materials, ceramic materials; as auxiliaries in cloth printing and in the paper industry, as additives to polymers; and as sizing agents for glass fibers and for finishing leather.

Dispersions and particularly solutions according to the present invention of acylurea group-containing polyisocyanate addition products which exclusively contain carboxylate groups as hydrophilic centers and have a molecular weight of about 600 to 10,000, preferably about 800 to 5000 and most preferably about 800 to 3000 (which is calculable from the type and stoichiometry of the starting materials) are particularly suitable for sizing paper. These relatively low molecular weight polyisocyanate addition products are preferably produced without the use of relatively high molecular weight polyhydroxyl compounds of the type given in (b1) and optionally with the use of chain-terminators such as monofunctional alcohols, for example, methanol, ethanol, n-butanol or n-octanol. An NCO-prepolymer is initially produced from difunctional starting materials using an NCO-excess and NCO-prepolymer is then reacted with the chain-terminator.

If the dispersions or solutions according to the present invention, particularly the latter-mentioned type of carboxylate group-containing, relatively low molecular weight polyisocyanate addition products are used as sizing agents for paper or for the production of sizing agents for paper, the additives conventionally used in paper sizing agents may also be used. These include alum, cationic or anionic auxiliaries (such as those based on cationic starch), quaternized polyamines, quaternized polyamide amines, quaternized basic formaldehyde resins, methyl cellulose, carboxymethylcellulose, lignin sulphonic acids, starches and polysaccharides of various strains, xanthan, pullulan, chitosan, polymers or copolymers of (meth)acrylic acid, (meth)acrylamide, maleic, fumaric, itaconic acid or other polymers and copolymers having carboxyl or sulphonic acid groups which are optionally in salt form or collagens, gelatin, alginates and caragenates.

The effectiveness of the sizing agents according to the present invention is not impaired by bleaching agents. The aqueous preparations may also be produced without emulsifying auxiliaries, although the use of such auxiliaries is possible.

The sizing agents are particularly suitable, on their own or in conjunction with other sizing agents, for the surface-sizing of paper, but may, of course, also be used for mass-production sizing. They may not only be used for chalk-containing or kaolin-containing papers, but also for those papers which contain no filler or a filler of another type such as talcum or gypsum. They are also suitable for sizing cellulose materials, such as cardboard, textile material, leather, pasteboard or chipboards or sound insulation boards.

The invention is further illustrated, but is not intended to be limited by the following examples in which all parts and percentages are by weight unless otherwise specified.

EXAMPLE 1

87.0 parts (0.5 mols) of 2,4-toluylene-diisocyanate were mixed at room temperature with 0.05 parts of a mixture of 1-methyl-1-phospha-2-cyclopentene-1-oxide and 1-methyl-1-phospha-3-cyclopentene-1-oxide and heated to 80° C. (in this case and in the following, all references to the reaction temperature relate to the temperature of the heating bath). The degree of carbodiimidization may be observed by the development of $CO_2$ and by the fall in the NCO-content. The temperature was cooled to 60° C. at an NCO-content of 32.9% and the reaction was stopped using 0.2 parts of phosphorus trichloride. A constant NCO-value was obtained after a further 30 min.

Analysis of the reaction product:
NCO-value: 30.1%
NCN-units per molecule (average value): 0.80

The resulting reaction mixture was mixed at 80° C. with 59.8 parts (0.575 mols) of neopentyl glycol dissolved in 56.8 parts of N-methylpyrrolidone. The NCO-value was 0.0% after 60 min. The mixture was heated to 150° C., mixed with 35.7 parts (0.125 mols) of stearic acid and stirred until there were no longer any visible traces of free acid (acid number=0.0).

The mixture was then cooled to 100° C. and mixed with 147.6 parts (0.88 mols) of hexamethylene diisocyanate. The mixture was cooled to 70° C. after 25 min and 842 parts of acetone were added. 65 parts (0.485 mols) of dimethylolpropionic acid dissolved in 65 parts by weight of N-methylpyrrolidone and 11.8 parts by weight (0.16 mols) of n-butanol were added after a further 30 min. The NCO-value was 0.0% after 9 hours at 70° C. The mixture was cooled to 60° C. and neutralized with 49.0 parts (0.485 mols) of triethylamine. The mixture was dispersed after 5 min with 983 parts of water and the solvent was drawn off by suction immediately thereafter.

A finely-divided dispersion was produced which had a solids content of 32.4%. The dispersed polyurethane contained a quantity of carboxylate groups of 109 milliequivalents per 100 g of solids, and a quantity of acylated urea groups,

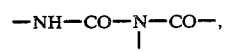

of 2.4%, based on solids.

EXAMPLE 2

87.0 parts (0.5 mols) of 2,4-toluylene-diisocyanate were mixed at room temperature with 0.05 parts of a mixture of 1-methyl-1-phospha-2-cyclopentene-1-oxide and 1-methyl-1-phospha-3-cyclopentene-1-oxide and heated to 80° C. The degree of carbodiimidization could be observed by the development of $CO_2$ and by the fall of the NCO content. The mixture was cooled to 60° C. at an NCO content of 22.4% and the reaction was stopped using 0.2 parts of phosphorus trichloride. A constant NCO value was obtained after a further 30 min.

Analysis of the reaction product:
NCO-value: 20.83%
NCN-units per molecule (average value): 1.76

The resulting reaction mixture was mixed at a temperature of 80° C. with 39.09 parts (0.357 mols) of neopentyl glycol dissolved in 44 parts of N-methylpyrrolidone. All of the NCO groups were reacted after 60 min. The mixture was heated to 150° C., mixed with 42.52 parts (0.149 mols) of stearic acid and stirred for 30 min (acid number 0.0%).

The mixture was then cooled to 100° C. and mixed with 107.6 parts (0.64 mols) of hexamethylene diisocyanate. The mixture was cooled to 80° C. after 15 min and 52.0 parts (0.39 mols) of dimethylol propionic acid and 8.63 parts (0.117 mols) of n-butanol were added. The mixture was diluted after a further 15 min with 150 parts of acetone. The NCO-value was 0.0% after 4 hours at 80° C. The mixture was cooled to 60° C. and neutralized with 39.2 parts (0.39 mols) of triethylamine. The mixture was dispersed after 10 min with 795 parts of water (50° C. warm) and the solvent was drawn off by suction immediately thereafter.

A finely-divided dispersion was produced which had a solids content of 24.7%. The dispersed polyurethane contained a quantity of carboxylate groups of 108 milliequivalents per 100 g of solids and a quantity of acylated urea groups of 3.5%, based on solids.

EXAMPLE 3

87.0 parts (0.5 mols) of 2,4-toluylene-diisocyanate were dissolved at room temperature in 100 parts of acetone, mixed with 0.05 parts of a mixture of 1-methyl-1-phospha-2-cyclopentene-1-oxide and 1-methyl-1-phospha-3-cyclopentene-1-oxide and heated to 80° C. The degree of carbodiimidization could be observed by the development of $CO_2$ and by the fall in the NCO content. The mixture was cooled to 60° C. at an NCO-content of 6.7% and the reaction was stopped with 0.2 parts of phosphorus trichloride. A constant NCO value was obtained after a further 30 min.

Analysis of the reaction product:
NCO value of the solution: 6.21%
NCN-units per molecule (average value): 2.96

The resulting reaction mixture was mixed at a temperature of 80° C. with 16.6 parts (0.268 mols) of ethylene glycol. The NCO-value was 0.0% after 30 min at 80° C.

The reaction mixture was heated to 90° C. and mixed with 61.3 parts (0.216 mols) of stearic acid.

The acid number was 0.0% after 2 hours at 90° C. and 92.1 parts (0.548 mols) of hexamethylene diisocyanate were added. After a further 30 min at 90° C., the mixture was mixed with 48.0 parts (0.350 mols) of dimethylol propionic acid and 7.38 parts (0.1 mol) of n-butanol in 150 parts of acetone. The NCO-value was 0.0% after 5.5 hours.

The mixture was cooled to 60° C. and neutralized with 36.2 parts (0.358 mols) of triethylamine.

The mixture was dispersed after 5 min with 945 parts of water. A finely-divided dispersion was produced which had a solids content of 23.2%. The dispersed polyurethane contained a quantity of carboxylate groups of 108 milliequivalents per 100 g of solids and a quantity of acylated urea groups of 5.5%, based on solids.

EXAMPLE 4

87.0 parts (0.5 mols) of 2,4-toluylene-diisocyanate were dissolved in 50 parts of acetone, mixed at room temperature with 0.05 parts of a mixture of 1-methyl-1-phospha-2-cyclopentene-1-oxide and 1-methyl-1-phospha-3-cyclopentene-1-oxide and heated to 80° C. The degree of carbodiimidization could be observed by the development of $CO_2$ and by the fall of the NCO content. The mixture was cooled to 60° C. at an NCO content of 12.0% and the reaction was stopped with 0.2 parts of phosphorus trichloride. A constant NCO-value was produced after a further 30 min.

Analysis of the reaction product:
NCO-value: 11.0%
NCN-units per molecule (average value): 2.12

The resulting reaction mixture was mixed at 80° C. with 62.0 parts (0.218 mols) of stearic acid and was stirred for 45 min at 80° C. 51.2 parts (0.492 mols) of neopentyl glycol in 50 parts of acetone were added. The following analysis values were obtained after 60 min:
NCO-value: 0.0%
Acid number: 0.0

The mixture was heated to 90° C. and mixed with 177.1 parts (1.02 mols) of 2,4-toluylene-diisocyanate and, after 5 min, with 80.0 parts (0.597 mols) of dimethylol propionic acid dissolved in 200 parts of acetone. After a reaction time of 2.5 hours, 13.7 parts (0.185 mols) of n-butanol dissolved in 200 parts of acetone were added at a temperature of 90° C.

After 3 hours, the NCO-value was 0.0%. The mixture was cooled to 70° C. and neutralized with
60.3 parts of triethylamine (0.597 mols). After 10 min, the mixture was dispersed with 1200 parts of water and the acetone was immediately drawn off by suction.

A finely-divided dispersion was produced which had a solids content of 27.8%. The dispersed polyurethane contained a quantity of carboxylate groups of 116 milliequivalents per 100 g of solids and a quantity of acylated urea groups of 3.6%, based on solids.

EXAMPLE 5

87.0 parts (0.05 mols) of 2,4-toluylene-diisocyanate were mixed at room temperature with 0.05 parts of a mixture of 1-methyl-1-phospha-2-cyclopentene-1-oxide and 1-methyl-1-phospha-3-cyclopentene-1-oxide and heated to 80° C. The degree of carbodiimidization could be observed by the development of $CO_2$ and by the fall of the NCO-content. The mixture was cooled to 60° C. at an NCO-content of 18.7% and the reaction was stopped using 0.02 parts of phosphorus trichloride. A constant NCO value was obtained after a further 30 min.

Analysis of the reaction product:
NCO-value: 17.85%
NCN-units per molecule (average value): 2.28

The resulting reaction mixture was mixed at a temperature of 80° C. with 62.15 parts (0.218 mols) of stearic acid and was stirred for 30 min at 80° C.

Analysis of the reaction product:
NCO-value: 10.6
Acid number: 0.0

57.8 parts (0.556 mols) of neopentylglycol, dissolved in 50 parts of toluene were then added at 80° C. The NCO-value was 0.0% after 45 min at 80° C. The reaction product was heated to 90° C. and mixed with 357.8 parts (0.206 mols) of 2,4-toluylene diisocyanate and, after a further 5 min, with 135.0 parts (1.0 mols) of dimethylol propionic acid. After a further hour, 101.6 parts (1.37 mols) of n-butanol, dissolved in 100 parts of toluene, were added at 90° C. After 80 min, the NCO-value was 0.0%. The mixture was cooled to 70° C. and neutralized with 101.0 parts (1.0 mols) of triethylamine and diluted after 10 min with 200 parts of toluene. The mixture was then dispersed with 2060 parts of water and the solvent was immediately drawn off by suction.

A finely-divided dispersion was produced which had a solids content of 30.45%. The dispersed polyurethane contained a quantity of carboxylate groups of 113 milliequivalents per 100 g of solids and a quantity of acylated urea groups of 2.1%, based on solids.

EXAMPLE 6

87.0 parts (0.5 mols) of 2,4-toluylene-diisocyanate were dissolved in 50 parts of acetone, mixed at room temperature with 0.05 parts of a mixture of 1-methyl-1-phospha-2-cyclopentene-1-oxide and 1-methyl-1-phospha-3-cyclopentene-1-oxide and heated to 80° C. The degree of carbodiimidization could be observed by the development of $CO_2$ and by the fall of the NCO content. The mixture was cooled to 60° C. at an NCO content of 11.1% and the reaction was stopped using 0.2 parts of phosphorus trichloride. A constant NCO value was obtained after a further 30 min.

Analysis of the reaction product:
NCO-value: 10.7% by weight
NCN units per molecule (average value): 3.26

The resulting reaction mixture was mixed at a temperature of 80° C. with 63.5 parts (0.223 mols) of stearic acid and stirred for 1 hour at 80° C.

Analysis of the reaction product:
NCO value: 7.4%
Acid number: 0.0

35.4 parts (0.34 mols) of neopentyl glycol, dissolved in 50 parts of acetone, were then added at 80° C. After 35 min at 80° C., the NCO value was 0.0%. The reaction product was heated to 90° C. and mixed with 173.5 parts of 2,4-toluylene-diisocyanate and, after a further 5 min, with 80.0 parts (0.597 mols) of dimethylol propionic acid. The mixture was diluted with 200 parts of acetone after 45 min and with 34.11 parts (0.46 mols) of n-butanol at 90° C. The NCO value was 0.0% after 70 min. The reaction product was then freed from solvent in the drying chamber and obtained as a solid material.

In order to convert the solid material into an aqueous dispersion or solution, it was introduced and stirred in lump or pulverulent form corresponding to the desired solids content into a solution of triethylamine in water. The finely-divided nature of the solution or dispersion could be determined using the quantity of triethylamine used.

87 parts of the resulting solids in pulverulent form were mixed with a solution of 12.94 parts (0.128 mols) of triethylamine in 233 parts of water and a slightly opaque solution was obtained which had a solids content of 30%. 89.7 parts of the resulting solids in pulverulent form were mixed with a solution of 10.34 parts (0.102 mols) of triethylamine in 233 parts of water and a finely-divided dispersion was obtained which had a solids content of 30%.

EXAMPLE 7

87 parts (0.5 mols) of 2,4-toluylene-diisocyanate were dissolved in 50 parts of acetone, mixed at room temperature with 0.02 parts of a mixture of 1-methyl-1-phospha-2-cyclopentene-1-oxide and 1-methyl-1-phospha-3-cyclopentene-1-oxide and heated to 80° C. The degree of carbodiimidization could be observed by the development of $CO_2$ and by the fall of the NCO content. The mixture was cooled to 60° C. at an NCO content of 16.8% and the reaction was stopped using 0.2 parts of phosphorus trichloride. A constant NCO value was obtained after a further 30 min.

Analysis of the reaction product:
NCO value: 16.75%
NCN units per molecule (average value): 0.98

The resulting reaction mixture was mixed with 47.2 parts (0.17 mols) of stearic acid at 80° C. and stirred for 1 hour at 80° C.

Analysis of the reaction product:
Acid number: 0.0

24.9 parts (0.143 mols) of 2,4-toluylene diisocyanate were then added at 80° C. and stirred for 10 min. The mixture was then mixed with 51.1 parts (0.38 mols) of dimethylol propionic acid and diluted with 200 parts of acetone. 38.52 parts (0.38 mols) of triethylamine were added to neutralize at an NCO value of 0.3% at 70° C., the mixture was dispersed with 555 parts of water after 10 min and the solvent was drawn off by suction immediately thereafter.

A slightly opaque solution was obtained which had a solids content of 27.1%, by weight. The dissolved polyurethane contained a quantity of carboxylate groups of 160 milliequivalents per 100 g of solids material and a quantity of acylated urea groups of 5.9%, based on solids.

EXAMPLE 8

87 parts (0.5 mols) of 2,4-toluylene diisocyanate were dissolved in 50 parts of acetone, mixed at room temperature with 0.02 parts of a mixture of 1-methyl-1-phospha-2-cyclopentene-1-oxide and 1-methyl-1-phospha-3-cyclopentene-1-oxide and heated to 80° C. The degree of carbodiimidization could be observed by the development of $CO_2$ and by the fall of the NCO content. The mixture was cooled to 60° C. at an NCO content of 16.1 and the reaction was stopped using 0.02 parts of phosphorus trichloride. A constant NCO value was obtained after 30 min.

Analysis of the reaction product:
NCO value: 16.07%
NCN units per molecule (average value): 1.08

The resulting reaction mixture was mixed at 80° C. with 49.2 parts (0.17 mols) of stearic acid and stirred for 1 hour at 80° C.

Analysis of the reaction product:
Acid number: 0.0

28.71 parts (0.165 mols) of 2,4-toluylenediisocyanate were added at 80° C. and stirred for 10 min. The mixture was then mixed with 52.3 parts (0.39 mols) of dimethylol propionic acid and 2.22 parts (0.03 mols) of n-butanol and diluted with 200 parts of acetone. At an NCO-value of 0.0%, by weight, the mixture is neutralized in 39.4 parts (0.39 mols) of triethylamine at 80° C. and was dispersed after 10 min with 580 parts of water and the solvent was drawn off by suction immediately thereafter.

A slightly opaque solution was obtained which had a solids content of 29.1%, by weight. The dissolved polyurethane contained a quantity of carboxylate groups of 158 milliequivalents per 100 g of solids material and a quantity of acylated urea groups of 5.9%, based on solids.

EXAMPLE 9

87.0 parts (0.5 mols) of 2,4-toluylene-diisocyanate were dissolved in 50 parts of acetone, mixed at room temperature with 0.03 parts of a mixture of 1-methyl-1-phospha-2-cyclopentene-1-oxide and 1-methyl-1-phospha-3-cyclopentene-1-oxide and heated to 80° C. The degree of carbodiimidization could be observed by the development of $CO_2$ and by the fall of the NCO content. The mixture was cooled to 60° C. at an NCO content of 9.0% and the reaction was stopped using 0.1 parts of phosphorus trichloride. A constant NCO value was obtained after a further 30 min.

Analysis of the reaction product:
NCO-value: 8.79% by weight
NCN units per molecule (average value): 2.96

The resulting reaction mixture was mixed at 80° C. with 70.9 parts (0.249 mols) of stearic acid and stirred for 2 hours at 80° C.

Analysis of the reaction product:
NCO-value: 5.92%
Acid number: 0.0

33.1 parts (0.19 mols) of 2,4-toluylene-diisocyanate were then added at 80° C. and stirred for 10 min. 64.35 parts (0.715 mols) of butane-1,4-diol were stirred in at 80° C. and subsequently stirred for 60 min. The mixture was then mixed with 33.75 parts (0.357 mols) of succinic acid anhydride dissolved in 50 parts of acetone. After a reaction time of 90 min at 80° C., the reaction mixture was cooled to 60° C. and neutralized with 36.1 parts (0.377 mols) of triethylamine. The mixture was dispersed with 725 parts water after 10 min and the acetone was drawn off by suction immediately thereafter.

A finely-divided dispersion was obtained which had a solids content of 28.6%, by weight. The dispersed polyurethane contained a quantity of carboxylate groups of 116 milliequivalents per 100 g of solids and a quantity of acylated urea groups of 6.9%, based on solids.

EXAMPLE 10

87.0 parts (0.5 mols) of 2,4-toluylene-diisocyanate were dissolved in 50 parts of acetone, mixed at room temperature with 0.05 parts of a mixture of 1-methyl-1-phospha-2-cyclopentene-1-oxide and 1-methyl-1-phospha-3-cyclopentene-1-oxide and heated to 80° C. The degree of carbodiimidization could be observed by the development of $CO_2$ and by the fall of the NCO content. The mixture was cooled to 60° C. at an NCO content of 7.83% and the reaction was stopped using 0.1 parts of phosphorus trichloride. A constant NCO value was obtained after a further 30 min.

Analysis of the reaction product:
NCO value: 7.85%
NCN units per molecule (average value): 3.46

The resulting reaction mixture was mixed at 80° C. with 73.8 parts (0.26 mols) of stearic acid and stirred for 80 min at 85° C.

Analysis of the reaction product:
NCO-value: 5.8% by weight
Acid number: 0.0

The mixture was then diluted with 300 parts of acetone, cooled to room temperature and 27.9 parts (0.266 mols) of diethanolamine were added. The temperature rose due to the exothermic reaction and was maintained at 80° C. After 30 min at 80° C., the resulting mixture was mixed with 106.3 parts (1.06 mols) of succinic acid anhydride. After a further 30 min, the mixture was cooled to 60° C. and neutralized with 107.4 parts (1.06 mols) of triethylamine. The mixture was stirred with 1525 parts of water after 10 min and the acetone was drawn off by suction immediately thereafter.

A clear solution was obtained which had a solids content of 17%, by weight. The dissolved polyurethane contained a quantity of carboxylate groups of 277 milliequivalents per 100 g of solids material and a quantity of acylated urea groups of 5.7%, based on solids.

EXAMPLE 11

87.0 (0.5 mols) of 2,4-toluylene-diisocyanate were mixed with 11.24 parts (0.125 mols) of butane-1,4-diol and reacted at 80° C. until a constant NCO value of 32.04% was obtained. The mixture was cooled to 60° C., diluted with 100 parts of acetone mixed with 0.05 parts of a mixture of 1-methyl-1-phospha-2-cyclopentene-1-oxide and 1-methyl-1-phospha-3-cyclopentene-1-oxide and then re-heated to 80° C. The carbodiimidization could be observed by the development of $CO_2$ and by the fall of the NCO content. The mixture was cooled to 60° C. at an NCO content of 4.8% and the reaction was stopped using 0.2 parts of phosphorus trichloride. A constant NCO value of 4.58% was obtained after a further 30 min.

The resulting reaction mixture was mixed with 51.75 parts (0.182 mols) of stearic acid at 80° C. and stirred for 60 min.

Analysis of the reaction product:
Acid number: 0.0

21.38 parts (0.204 mols) of diethanolamine were then added and the mixture was stirred at 80° C. until an NCO value of 0.0% was obtained. The mixture was then mixed with 60.26 parts (0.407 mols) of phthalic acid anhydride, cooled to 60° C. after 30 min and neutralized with 41.1 parts (0.407 mols) of triethylamine. The mixture was stirred with 610 parts of water after 10 min and the acetone was drawn off by suction immediately thereafter. A clear solution was produced which had a solids content of 27%. The dissolved polyurethane contained a quantity of carboxylate groups of 165 milliequivalents per 100 g of solids material and a quantity of acylated urea groups of 5.9%, based on solids.

EXAMPLE 12

400 parts (2.3. mols) of a mixture of 2,4-toluylene diisocyanate and 2,6-toluylene diisocyanate in ratio of 65:35 were dissolved in 100 parts of acetone, mixed at room temperature with 0.1 parts of a mixture of 1-methyl-1-phospha-2-cyclopentene-1-oxide and 1-methyl-1-phospha-3-cyclopentene-1-oxide and heated to 80° C. The degree of carbodiimidization could be observed by the development of $CO_2$ and by the fall of the NCO content. The mixture was cooled to 60° C. at an NCO content of 22.3 and the reaction was stopped using 0.2 parts of phosphorus trichloride. A constant NCO value was obtained after a further 30 min.

Analysis of the reaction product:
NCO value: 20.6%
NCN units per molecule (average value): 1.09

The reaction product was then mixed with 228 parts (0.801 mols) of stearic acid and reacted at 80° C. until the acid number was 0.0: the acetone was drawn off by suction.

Analysis of the reaction product:
Acid number: 0.0
NCO value: 15.9% by weight 79.7 parts of a polyester diol of phthalic acid and ethylene glycol (OH-number=287.7), 53.4 parts of a polyester diol of phthalic acid, adipic acid (weight ratio 1:1) and ethylene glycol (OH-number=64.1), 22.9 parts of a polyethylene oxide-polypropylene oxide polyether which had been started on butanol (OH-number=26; 73.3% ethylene oxide) and 21.5 parts of a propoxylated adduct of 2-butene-1,4 diol and $NaHSO_3$ (MW: 430;

70% in toluene) were dehydrated for 30 min at 110° C. under a waterjet vacuum. The mixture was cooled to 80° C. and mixed with 53.9 parts (0.21 mols) of bis-(4-isocyanato-cyclohexyl)-methane, 23.1 parts (0.14 mols) of hexamethylene diisocyanate and 46.5 parts of the aforementioned acylated urea group-containing polyisocyanate and was stirred until a constant NCO value of 4.05% was obtained. The mixture was then cooled to 70° C. and mixed with 19.1 parts (0.28 mols) of 25% aqueous ammonia solution dissolved in 100 parts of water. After 15 min at 70° C., the mixture was dispersed with 584 parts of water, mixed with 18.6 parts of 30% aqueous formaldehyde solution after a further 15 min at 50° C. and subsequently stirred for 1 hour at 50° C.

A finely-divided dispersion having a pH of 6.5 and a solids content of 28% was produced. The dispersed solids material contained a quantity of sulphonate groups of 11.5 milliequivalents per 100 g, a quantity of ethylene oxide units incorporated in a polyether chain of 5.9% and a quantity of acylated urea groups of 0.97%.

EXAMPLE 13

400 parts (2.3 mols) of a mixture of 2,4-toluylene diisocyanate and 2,6-toluylene diisocyanate in a ratio of 65:35 were dissolved in 100 parts of acetone, mixed at room temperature with 0.1 parts of a mixture of 1-methyl-phospha-2-cyclopentene-1-oxide and 1-methyl-1-phospha-3-cyclopentene-1-oxide and heated to 80° C. The degree of carbodiimidization could be observed by the development of $CO_2$ and by the fall of the NCO content. The mixture was cooled to 60° C. at an NCO content of 21.86% and the reaction was stopped using 0.2 parts of phosphorus trichloride. A constant NCO value was obtained after a further 30 min.

Analysis of the reaction product:
NCO value: 21.12%
NCN units per molecule (average value): 1.04

The reaction product was then mixed with 56.2 parts (0.78 mols) of acrylic acid and reacted at 80° C. until the acid number was 0.0: the acetone was drawn off by suction.

Analysis of the reaction product:
Acid number: 0.0
NCO value: 22.3%

79.7 parts of a polyester diol of phthalic acid and ethylene glycol (OH number: 287.7), 53.4 parts of the polyester diol according to Example 12 based on phthalic acid, adipic acid and ethylene glycol (OH number: 64.1), 21.2 parts of a polyethylene oxide-polypropylene oxide polyether which had been started on butanol (OH number: 26; 73.3% ethylene oxide) and 19.7 parts of a propoxylated adduct of 2-butene-1,4 diol and NaHSO$_3$ (MW 430; 70% in toluene) were dehydrated for 30 min at 110° C. under a waterjet vacuum. The mixture was cooled to 80° C. and mixed with 53.3 parts (0.20 mols) of bis-(4-isocyanatocyclohexyl)-methane, 22.9 parts (0.14 mols) of hexamethylene diisocyanate and 25.6 parts of the aforementioned acylurea diisocyanate and stirred until a constant NCO value of 3.97% was obtained. The mixture was then cooled to 70° C. and mixed with 17.3 parts (0.25 mols) of a 25% aqueous ammonia solution dissolved in 100 parts of water. After 15 min at 70° C., the mixture was dispersed with 526 parts of water and after a further 15 min at 50° C., mixed with 18.6 parts of 30% aqueous formaldehyde solution and subsequently stirred for 1 hour at 50° C.

A finely-divided dispersion was obtained which had a pH of 7.0 and a solids content of 28.8%. The dispersed solids material contained a quantity of sulphonate groups of 11.5 milliequivalents per 100 g, a quantity of ethylene oxide units incorporated in a polyether chain of 5.9% and a quantity of acylated urea groups of 1.5%.

EXAMPLE 14

870 parts (5.0 mols) of a mixture of 2,4-toluylenediisocyanate and 2,6-toluylene diisocyanate in a ratio 65:35 were mixed at room temperature with 0.1 parts of a mixture of 1-methyl-phospha-2-cyclopentene-1-oxide and 1-methyl-1-phospha-3-cyclopentene-1-oxide and heated to 80° C. The degree of carbodiimidization could be observed by the development of $CO_2$ and by the fall of the NCO content. The mixture was cooled to 60° C. at an NCO content of 28.1% and the reaction was stopped using 0.6 parts of phosphorus trichloride. A constant NCO value was obtained after a further 30 min.

Analysis of the reaction product:
NCO value: 27.7%
NCN units per molecule (average value): 1.0

150 parts of the resulting carbodiimide were mixed with 33.5 parts (0.25 mols) of phenylacetic acid and reacted at 80° C. until the acid number was 0.0.

Analysis of the reaction product:
Acid number: 0.0
NCO value: 19.4%, by weight 79.7 parts of a polyester diol of phthalic acid and ethylene glycol (OH-number: 287.7), 53.4 parts of a polyester diol of phthalic acid, adipic acid (weight ratio 1:1) and ethylene glycol (OH-number=64.1), 22.9 parts of a polyethylene oxide-polypropylene oxide polyether which had been started on butanol (OH-number=26; 73.3% ethylene oxide) and 21.5 parts of a propoxylated adduct of 2-butene-1,4 diol and NaHSO$_3$ (MW: 430; 70% in toluene) were dehydrated for 30 min at 110° C under a waterjet vacuum. The mixture was cooled to 80° C. and mixed with 54.1 parts (0.21 mols) of bis-(4-isocyanatocyclohexyl)-methane, 30.8 parts (0.18 mols) of hexamethylene diisocyanate and 12.5 parts of the aforementioned acylated urea group-containing polyisocyanate and stirred until a constant NCO value of 4.2% was obtained. The mixture was then cooled to 70° C. and mixed with 18.2 parts (0.27 mols) of 25% aqueous ammonia solution dissolved in 100 parts of water. After 15 min at 70° C., the mixture was dispersed with 540 parts of water, mixed after a further 15 min at 50° C. with 12.6 parts of a 30% aqueous formaldehyde solution and subsequently stirred for 1 hour at 50° C.

A finely-divided dispersion was produced which had a pH of 7.5 and a solids content of 30%. The dispersed solids material contained a quantity of sulphonate groups of 12.6 milliequivalents per 100 g, a quantity of ethylene oxide units incorporated in a polyether chain of 6.5% and a quantity of acylated urea groups of 0.59%.

EXAMPLE 15

150 parts of the carbodiimide from Example 14 were mixed with 30 parts (0.246 mols) of benzoic acid and reacted at 80° C. until the acid number was 0.0.

Analysis of the reaction product:
Acid number: 0.0
NCN value: 20.4% by weight 79.7 parts of a polyester diol of phthalic acid and ethylene glycol (OH-number=287.7), 53.4 parts of a polyester diol of phthalic acid, adipic acid (weight ratio 1:1) and ethylene glycol (OH-number=64.1), 22.9 parts of a polyethylene oxide-polypropylene oxide polyether which had been started on butanol (OH-number=26; 73.3% ethylene oxide) and 21.5 parts of a propoxylated adduct of 2-butene-1,4 diol and $NaHSO_3$ (MW: 430; 70% in toluene) were dehydrated for 30 min at 110° C. under a waterjet vacuum. The mixture was cooled to 80° C. and mixed with 54.1 parts (0.21 mols) of bis-(4-isocyanatocyclohexyl)-methane, 30.8 parts (0.18 mols) of hexamethylene diisocyanate and 13.5 parts of the aforementioned acylated urea group-containing polyisocyanate and stirred until a constant NCO value of 4.15% was obtained. The mixture was then cooled to 70° C. and mixed with 18.1 parts (0.27 mols) of 25% aqueous ammonia solution dissolved in 100 parts of water. After 15 min at 70° C., the mixture was dispersed with 540 parts of water and after a further 15 min at 50° C., mixed with 12 parts of 30% aqueous formaldehyde solution and subsequently stirred for 1 hour at 50° C.

A finely-divided dispersion was produced which had a pH of 7.5 and a solids content of 28%. The dispersed solids material contained a quantity of sulphonate groups of 12.6 milliequivalents per 100 g, a quantity of ethylene oxide units incorporated in a polyether chain of 6.5% and a quantity of acylated urea groups of 0.98%.

EXAMPLE 16

87 parts (0.5 mols) of 2,4-diisocyanatotoluene were dissolved in 60 parts of acetone, mixed at room temperature with 0.02 parts of a mixture of 1-methyl-1-phospha-2-cyclopentene-1-oxide and 1-methyl-1-phospha-3-cyclopentene-1-oxide and heated to 80° C. The degree of carbodiimidization could be observed by the development of $CO_2$ and by the fall of the NCO content. The mixture was cooled to 60° C. at an NCO content of 12.1% and the reaction was stopped using 0.05 parts of phosphorus trichloride. A constant NCO value was obtained after a further 30 min.

Analysis of the reaction product:
NCO content: 11.6%
NCN units per molecule (average value): 1.96

The resulting reaction mixture was mixed at 80° C. with 80.3 parts (0.25 mols) of safacidic acid (hydrogenated herring oil, acid number 173.4) and reacted until there were no more detectable traces of acid. 7.61 parts of 1,4-dihydroxy-butane (0.085 mols) were then added. After 2 hours at 80° C., the mixture was mixed with 17.8 parts (0.17 mols) of diethanolamine in 200 parts of acetone. At an NCO content of 0%, 33.8 parts, by weight, of succinic acid anhydride (0.338 mols) were added. After 35 min, the mixture was cooled to 70° C., neutralized with 34.2 parts (0.338 mols) of triethylamine and dispersed after 10 min with 75 parts of water. The acetone was drawn off by suction immediately thereafter under vacuum.

A clear solution was produced which had a solids content of 27.4%. The dissolved solids material contained a quantity of carboxylate groups of 137 milliequivalents per 100 g and a quantity of acylated urea groups of 8.6%. The calculated molecular weight was 2910.

EXAMPLE 17

161 parts (0.925 mols) of a mixture of 2,4-diisocyanatotoluene and 2,6-diisocyanatotoluene (weight ratio=65:35) were mixed at room temperature with 0.2 parts of a mixture of the dimerization catalyst given in Example 16 and heated to 80° C. The process was continued as described in Example 16. The carbodiimidized diisocyanate finally obtained had an NCO content of 9.13%. It was diluted with 100 parts of acetone. 100.6 parts (0.356 mols) of oleic acid were added at 80° C. and reacted until there were no more visible traces of free acid. The reaction product was then extended with 13.7 parts (0.152 mols) of 1,4-dihydroxybutane dissolved in 100 parts of acetone. After 2.5 hours, the mixture was diluted with a further 200 parts of acetone and after a further 5 min, mixed with 32.0 parts (0.305 mols) of diethanolamine. After a further 15 min, 60.9 parts (0.61 mols) of succinic acid anhydride were added and stirred for 60 min at 80° C. The mixture was then neutralized with 61.5 parts (0.61 mols) of triethylamine and dispersed with 940 parts of water. A clear solution was produced which had a solids content of 27.4%. The reaction product contained a quantity of carboxylate groups of 153 milliequivalents per 100 g of solids and a quantity of acylated urea groups of 7.6%, based on solids.

EXAMPLE 18

87.0 parts (0.5 mols) of 2,4-toluylene diisocyanate were dissolved in 50 parts of acetone, mixed at room temperature with 0.05 parts of a mixture of 1-methyl-1-phospha-2-cyclopentene-1-oxide and 1-methyl-b 1-phospha-3-cyclopentene-1-oxide and heated to 80° C. The degree of carbodiimidization could be observed by the development of $CO_2$ and by the fall in the NCO content. At an NCO content of 12.28%, the mixture was cooled to 60° C. and the reaction was stopped using 0.2 parts of phosphorus trichloride. After a further 30 min, a constant NCO value was achieved.

Analysis of the reaction product:
NCO value: 11.6% by weight
NCN units per molecule (average value): 1.95

The resulting reaction mixture was mixed at 80° C. with 62.9 parts (0.221 mols) of stearic acid and stirred for 60 min at 80° C. 7.6 parts (0.084 mols) of butane-1,4 diol were then added at 80° C. After 60 min at 80° C., the mixture was diluted with 100 parts of acetone and mixed with 17.7 parts (0.168 mols) of diethanolamine. After 40 min, 33.7 parts (0.337 mols) of succinic acid anhydride dissolved in 100 parts of acetone were added and stirred for 60 min at 80° C. The mixture was then cooled to 70° C., neutralized with 34 parts (0.337 mols) of triethylamine and after 15 min stirred with 535 parts of water.

The acetone was drawn off by suction immediately thereafter. A clear solution was produced which had a solids content of 27%. The dissolved solids material contained a quantity of carboxylate groups of 147 milliequivalents per 100 g and a quantity of acylated urea groups of 8.2%. The calculated molecular weight was 2700.

EXAMPLE 19

87.0 parts (0.5 mols) of 2,4-toluylene diisocyanate were dissolved in 50 parts of acetone, mixed at room temperature with 0.05 parts of a mixture of 1-methyl-1-phospha-2-cyclopentene-1-oxide and 1-methyl- 1-phospha-3-cyclopentene-1-oxide and heated to 80° C. The degree of carbodiimidization could be observed by the development of $CO_2$ and by the fall of the NCO content. At an NCO content of 9.44%, the mixture was cooled to 60° C. and the reaction was stopped with 0.2 parts of phosphorus trichloride. After a further 30 min, a constant NCO value was obtained.

Analysis of the reaction product:
NCO value: 8.81%
NCN units per molecule (average value): 2.95

The resulting reaction mixture was mixed at 80° C. with 70.72 parts (0.249 mols) of stearic acid and stirred for 60 min at 80° C. 5.72 parts (0.0635 mols) of butane-1,4 diol dissolved in 100 parts of acetone were then added at 80° C. After 90 min at 80° C., the mixture was mixed with 13.3 parts (0.127 mols) of diethanolamine. After a further 30 min, 25.4 parts (0.254 mols) of succinic acid anhydride dissolved in 100 parts of acetone were added and stirred for 60 min at 80° C. The mixture was then cooled to 70° C., neutralized with 25.6 parts (0.254 mols) of triethylamine and dispersed with 493 parts of water after 15 min. The acetone was drawn off by suction immediately thereafter. A finely-divided dispersion was obtained which had a solids content of 28.5%. The dispersed solids material contained a quantity of carboxylate groups of 120 milliequivalents per 100 g and a quantity of acylated urea groups of 10.0%. The calculated molecular weight was 3300.

EXAMPLE 20

87.0 parts (0.5 mols) of 2,4-toluylene diisocyanate were mixed at room temperature with 0.05 parts of a mixture of 1-methyl-1-phospha-2-cyclopentene-1-oxide and 1-methyl-1-phospha-3-cyclopentene-1-oxide and heated to 80° C. The degree of carbodiimidization could be observed by the development of $CO_2$ and by the fall of the NCO content. The mixture was cooled to 60° C. at an NCO content of 19.35% and the reaction was stopped using 0.2 parts of phosphorus trichloride. A constant NCO value was obtained after a further 30 min.

Analysis of the reaction product:
NCO value: 17.85
NCN units per molecule (average value): 2.28

The resulting mixture was mixed at 80° C. with 51.9 parts (0.499 mols) of neopentyl glycol dissolved in 50 parts of toluene.

There were no traces of NCO groups after 30 min. Then at 80° C., 57.9 parts (0.20 mols) of stearic acid were added and stirred for 100 min until the acid groups had completely reacted (acid number 0.0). Then at 90° C., 310.8 parts of 2,4-toluylene diisocyanate (0.179 mols) and, after 5 min, 115.0 parts (0.858 mols) of dimethylol propionic acid and 1 part (0.0016 mols) of dibutyl tin dilaurate were added. After a further 40 min, 88.26 parts (1.19 mols) of n-butanol in 100 parts of toluene were added at 90° C. After 90 min, the NCO value was 0.0%. The mixture was cooled to 70° C. and neutralized with 86.7 parts (0.858 mols) of triethylamine. The mixture was dispersed after 30 min at 70° C. with 1860 parts of water and the solvent was then immediately distilled off.

A finely-divided dispersion was produced which had a solids content of 29.4%. The dispersed solids material contained a quantity of carboxylate groups of 110 milliequivalents per 100 g and a quantity of acylated urea groups of 2.2%. The calculated molecular weight was 1330.

EXAMPLE 21

87.0 parts (0.5 mols) of 2,4-toluylene diisocyanate were dissolved in 50 parts of acetone, mixed at room temperature with 0.05 parts of a mixture of 1-methyl-1-phospha-2-cyclopentene-1-oxide and 1-methyl-1-phospha-3-cyclopentene-1-oxide and heated to 80° C. The degree of carbodiimidization could be observed by the development of $CO_2$ and by the fall of the NCO content. The mixture was cooled to 60° C. at an NCO content of 11.28% and the reaction was stopped using 0.2 parts of phosphorus trichloride. A constant NCO value was obtained after a further 30 min.

Analysis of the reaction product:
NCO value: 10.84%
NCN units per molecule (average value): 2.17

The resulting reaction mixture was mixed at 80° C. with 62.9 parts (0.221 mols) of stearic acid and reacted for 80 min. 37.4 parts (0.36 mols) of neopentyl glycol dissolved in 50 parts of acetone were then added at 80° C. After 45 min at 80° C., the mixture was mixed with 179 parts (1.03 mols) of 2,4-toluylene diisocyanate and, after a further 5 min, with 82 parts (0.612 mols) of dimethylol propionic acid. The mixture was diluted with 200 parts of acetone after 30 min at 90° C. and, after a further 100 min, 35.2 parts (0.475 mols) of n-butanol were added. After 2 hours at 90° C., the mixture was neutralized with 61.8 parts (0.612 mols) of triethylamine and after 10 min was stirred with 1232 parts of water. The acetone was drawn off by suction immediately thereafter. A clear solution was produced which had a solids content of 29.6%, by weight. The dissolved solids material contained a quantity of carboxylate groups of 113 milliequivalents per 100 g and a content of acylated urea groups of 4.6%. The calculated molecular weight was 2260.

EXAMPLE 22

87.0 parts (0.5 mols) of 2,4-toluylene diisocyanate were dissolved in 50 parts of acetone, mixed at room temperature with 0.05 parts of a mixture of 1-methyl-1-phospha-2-cyclopentene-1-oxide and 1-methyl-1-phospha-3-cyclopentene-1-oxide and heated to 80° C. The degree of carbodiimidization could be observed by the development of $CO_2$ and by the fall of the NCO content. The mixture was cooled to 60° C. at an NCO content of 11.05% and the reaction was stopped using 0.2 parts of phosphorus trichloride. A constant NCO value was obtained after a further 30 min.

Analysis of the reaction product:
NCO value: 10.72% by weight
NCN units per molecule (average value): 2.21

The resulting reaction mixture was mixed at 80° C. with 63.5 parts (0.223 mols) of stearic acid and reacted for 90 min at 80° C. The mixture was then mixed at 80° C. with 30.73 parts (0.342 mols) of butane-1,4 diol. After 70 min at 80° C., the mixture was heated to 90° C. and 144.7 parts (0.832 mols) of 2,4-toluylene diisocyanate were added. 70 parts of dimethylolpropionic acid were then added after 5 min. The mixture was diluted with 200 parts of acetone after 30 min and mixed with 20.6 parts (0.277 mols) of n-butanol after a further 135 min. The mixture was subsequently stirred for 2 hours at 90° C., the acetone was then drawn off by suction and the reaction product was freed from residual solvent in the drying chamber and obtained as solids material.

In order to convert the mixture into an aqueous dispersion or solution, the solids material, in lump or pulverulent form, was introduced and stirred in a quantity corresponding to the desired solids content into a solution of triethylamine in water. The finely-divided nature of the solution or dispersion could be determined by means of the quantity of triethylamine used.

30 parts of the resulting solids in pulverulent form were mixed with a solution of 3.86 parts of triethylamine in 79.02 parts of water and a clear solution was obtained which had a solids content of 30%. The solids material of the resulting solution contained 127 milliequivalents per 100 g of carboxylate groups and 3.1% of incorporated acylurea groups.

The dispersions and solutions produced according to Examples 18 to 22 were examined in the following with regard to the suitability thereof as sizing agents for paper. The sizing agent according to Example 4 of DE-AS No. 2,457,972 (U.S. Pat. No. 4,096,127) was given for comparison.

FOAMING BEHAVIOR

In order to determine the foaming behavior of the sizing agents according to the present invention, they were examined in a laboratory foaming test apparatus which approximately represented the conditions of the sizing press of a paper machine. In this apparatus, the sizing liquor which contained the sizing agent to be examined, starch and optionally further additives, was drawn out of a thermo-stated beaker at a constant speed through a conduit located at the base of this beaker and was pumped back through a steel tube which passes through the lid of the beaker into the latter. This steel tube ends 150 mm above the surface of the liquid with the result that the sizing liquor issued as a direct jet onto the surface of the liquid, thereby causing foam formation. The volume of foam measured in ml after a particular test time over the surface of the sizing liquor was thus a measure of the tendency to foam of the liquid to be examined.

The following table shows the foaming behavior of the aforementioned solutions or dispersions according to Examples 18 to 22 which were examined using the above testing apparatus in comparison with the product produced according to DE-AS NO. 2,457,972. For this purpose, 700 ml of an aqueous sizing agent liquor were produced in each case which contained 5% of a conventional starch and 0.3% of the sizing agent to be examined. The solutions were heated to 60° C. and pumped at the speed of 200 l/h through the testing apparatus. The volume of foam forming during the course of the test on the surface of the liquid was measured in ml at intervals of 5 min.

TABLE 1

| | Volume of foam in ml after a test time | | | | | |
|---|---|---|---|---|---|---|
| | 5 | 10 | 15 | 20 | 25 | 30 min |
| Comparison | 300 | 500 | 800 | 1000 | 1200 | 1500 |
| Sizing agent (18) | 0 | 0 | 0 | 0 | 0 | 0 |
| Sizing agent (19) | 0 | 0 | 0 | 0 | 0 | 0 |
| Sizing agent (20) | 0 | 0 | 0 | 50 | 80 | 100 |
| Sizing agent (21) | 0 | 0 | 0 | 0 | 50 | 70 |
| Sizing agent (22) | 0 | 0 | 0 | 0 | 0 | 0 |

USE EXAMPLES

The use examples demonstrate the good sizing effect of the sizing agents according to the present invention on papers having different material compositions. The Cobb value (according to DIN 53 132) was determined as a measure of the particular sizing.

The papers used have the following compositions:

(a) Alum-free paper

50% softwood pulp, 50% hardwood pulp, 10.5% clay-ash pH in the headbox: 7.3; wet absorption in a laboratory sizing press: about 80%; paperweight: 80 g/m$^2$.

(b) Alum-containing paper

50% softwood pulp, 50% hardwood pulp, 1% alum, 11.8% clay-ash, pH in the headbox: 4.4; wet absorption: about 80%, paperweight: 80 g/m$^2$.

(c) Pre-sized paper

50% softwood pulp, 50% hardwood pulp, 1% alum 0.1% bewoid size, 11.9% pre-ash, pH in the headbox: 4.5; wet absorption: about 60%; paperweight 80 g/m$^2$.

(d) Chalk-containing paper

50% softwood pulp, 50% hardwood pulp, 10.9% chalk-ash, pH in the headbox: 7.5; wet absorption: about 90%; paperweight: 75 g/m$^2$.

(e) Wood-containing paper

40% softwood pulp, 60% mechanical wood pulp, 12.0 clay ash, pH in the headbox: 4.5; wet absorption: about 40%; paperweight: 75 g/m$^2$.

The papers were sized on a laboratory sizing press manufactured by Mathis, Zurich:Switzerland, type HF. A solution of 5%, by weight of conventional starch and from 0.2 to 0.6%, by weight, of the sizing agent to be tested (calculated as a 100% active substance) in water was used as the sizing liquor.

The surface-sized papers were dried on a drying drum over the course of a minute at about 100° C. Before the sizing test, the papers were air-conditioned for 2 hours at room temperature.

TABLE 2

| | Sizing test: g/qm of water absorption in 60 sec according to DIN 53 132 | | | | | | |
|---|---|---|---|---|---|---|---|
| | Quantity | Type of sizing agent | | | | | |
| Type of paper | %/liquor | V | 18 | 19 | 20 | 21 | 22 |
| (a) alum-free | 0.4% | 27.2 | 25.3 | 27.0 | 30.4 | 29.5 | 23.4 |
| (b) alum-containing | 0.2% | 21.7 | 20.8 | 22.1 | 22.8 | 22.4 | 24.3 |
| (c) pre-sized | 0.2% | 19.3 | 20.1 | 19.5 | 19.1 | 19.5 | 20.3 |
| (d) chalk-containing | 0.6% | 25.7 | 26.3 | 24.9 | 27.0 | 28.3 | 24.3 |
| (e) wood-containing | 0.2% | 19.1 | 18.9 | 19.4 | 18.7 | 19.0 | 19.1 |

V = Comparative substance, Example 4 of DE-OS 2,457,972 (U.S. Pat. No. 4,096,127)
The Cobb values are given in g/m$^2$ of water absorption in 60 seconds, determined according to DIN 53 132. Lower Cobb values designate a better sizing effect.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An aqueous solution or dispersion of a polyisocyanate addition product which contains about 2 to 300 milliequivalents per 100 g of solids of chemically incorporated sulphonate and/or carboxylate groups and up to about 25% by weight, based on solids, of chemically incorporated ethylene oxide units, —CH$_2$—CH$_2$—O—, in a lateral and/or terminal polyether chain, said sulphonate and/or carboxylate groups and said ethylene oxide units being present in an amount sufficient to guarantee the solubility or dispersibility of said polyisocyanate addition product in water, said polyisocyanate addition product additionally containing structural units corresponding to the formula:

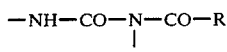

wherein
R represents a saturated or unsaturated aliphatic hydrocarbon radical having from 1 to 35 carbon atoms, and aromatic hydrocarbon radical having 6 to 10 carbon atoms or an araliphatic hydrocarbon radical having 7 to 10 carbon atoms, or if several radicals R are present in the same molecule, R may represent different radicals corresponding to this definition;
said polyisocyanate addition product containing a total of incorporated structural units as set forth in the above formula which is determined by the quantity of acylated urea groups corresponding to the formula:

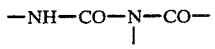

of about 0.1 to 20% by weight.

2. A process for the production of an aqueous solution or dispersion of a polyisocyanate addition product which comprises reacting
(a) an organic polyisocyanate with
(b) an isocyanate-reactive compound,
said organic polyisocyanate or said isocyanate-reactive compound containing about 2 to 300 milliequivalents per 100 g of solids of chemically incorporated sulphonate and/or carboxylate groups and up to about 25% by weight of chemically incorporated ethylene oxide units, —CH$_2$—CH$_2$—O—, in a polyether chain, said sulphonate and/or carboxylate groups and said ethylene oxide units being present in an amount sufficient to guarantee the solubility or dispersibility of said polyisocyanate addition product in water components (a) and/or (b) containing acylurea groups corresponding to the formula:

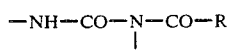

in an amount of 0.1 to 20% by weight, based on solids of structural units corresponding to the formula

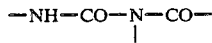

and
(c) converting the polyisocyanate addition product into an aqueous solution or dispersion during or subsequent to the reaction between components (a) and (b).

3. The process of claim 2 wherein said polyisocyanate addition product contains free hydroxyl groups, said process comprising reacting said hydroxyl groups with cyclic carboxylic acid anhydrides to chemically incorporate said anhydrides into the polyisocyanate addition product and also form free carboxylic acid groups which are neutralized to form carboxylate groups before or during the conversion of the polyisocyanate addition product into a solution or dispersion.

4. A process for coating a flexible or inflexible substrate which comprises applying the polyisocyanate addition product of claim 1 to said substrate and curing said coating.

5. A process for sizing paper which comprises using the polyisocyanate addition product of claim 1 as sizing agent.

* * * * *